(12) United States Patent
Selvidge

(10) Patent No.: US 8,843,861 B2
(45) Date of Patent: Sep. 23, 2014

(54) THIRD PARTY COMPONENT DEBUGGING FOR INTEGRATED CIRCUIT DESIGN

(71) Applicant: Mentor Graphics Corporation, Wilsonville, OR (US)

(72) Inventor: Charles W. Selvidge, Wellesley, MA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/771,057

(22) Filed: Feb. 19, 2013

(65) Prior Publication Data
US 2013/0318484 A1  Nov. 28, 2013

Related U.S. Application Data

(60) Provisional application No. 61/741,766, filed on Feb. 16, 2012.

(51) Int. Cl.
G06F 17/50 (2006.01)
G06F 9/455 (2006.01)

(52) U.S. Cl.
CPC .......... *G06F 17/505* (2013.01); *G06F 17/5022* (2013.01); *G06F 2217/66* (2013.01); *G06F 17/5045* (2013.01)
USPC .......................................... 716/102; 716/106

(58) Field of Classification Search
USPC ................................................ 716/102, 106
See application file for complete search history.

(56) References Cited

U.S. PATENT DOCUMENTS

| | | | |
|---|---|---|---|
| 5,649,176 A | 7/1997 | Selvidge et al. | |
| 5,659,716 A | 8/1997 | Selvidge et al. | |
| 5,802,348 A | 9/1998 | Stewart et al. | |
| 6,223,148 B1 | 4/2001 | Stewart et al. | |
| 6,304,998 B1 * | 10/2001 | Kamiya et al. | 716/108 |
| 6,817,001 B1 | 11/2004 | Kudlugi et al. | |
| 6,961,691 B1 | 11/2005 | Selvidge et al. | |
| 6,999,910 B2 * | 2/2006 | Koford et al. | 703/13 |
| 7,039,576 B2 * | 5/2006 | Akita | 703/19 |
| 7,143,377 B1 | 11/2006 | Kudlugi et al. | |
| 7,257,802 B2 | 8/2007 | Daw et al. | |
| 7,260,798 B2 | 8/2007 | Gupta et al. | |
| 7,454,722 B2 | 11/2008 | Gupta et al. | |
| 7,480,610 B2 | 1/2009 | Scott et al. | |
| 7,730,353 B2 | 6/2010 | Brunot et al. | |
| RE41,659 E | 9/2010 | Gupta et al. | |
| 8,108,198 B2 | 1/2012 | Schmitt et al. | |
| 8,108,729 B2 | 1/2012 | Brunot et al. | |
| 8,181,129 B2 | 5/2012 | Gupta et al. | |
| 8,229,727 B2 | 7/2012 | Gupta et al. | |
| 8,352,242 B2 | 1/2013 | Schmitt et al. | |
| 8,516,411 B2 | 8/2013 | Gupta et al. | |
| 2001/0010036 A1 | 7/2001 | Stewart et al. | |
| 2005/0080502 A1 * | 4/2005 | Chernyak et al. | 700/97 |
| 2005/0268268 A1 * | 12/2005 | Wang et al. | 716/9 |
| 2007/0180413 A1 * | 8/2007 | Park | 716/5 |
| 2008/0222581 A1 * | 9/2008 | Banerjee et al. | 716/4 |
| 2010/0306728 A1 * | 12/2010 | Ardeishar et al. | 716/106 |
| 2012/0221316 A1 | 8/2012 | Brunot et al. | |
| 2014/0032204 A1 | 1/2014 | Suresh et al. | |
| 2014/0052430 A1 | 2/2014 | Suresh et al. | |

* cited by examiner

*Primary Examiner* — Vuthe Siek
*Assistant Examiner* — Magid Dimyan
(74) *Attorney, Agent, or Firm* — Klarquist Sparkman, LLP

(57) ABSTRACT

The application is directed towards facilitating the debugging of suspected errors in a proprietary component when the proprietary component is incorporated into a larger electronic design. Various implementations provide for the generation of a reference model for an integrated circuit design, where the reference model includes the proprietary component and sufficient information about the rest of the design to allow for the debugging of the proprietary component over a period of verification where the error in the proprietary component is suspected.

18 Claims, 7 Drawing Sheets

THIRD PARTY COMPONENT DEBUGGING FOR INTEGRATED CIRCUIT DESIGN

This application claims priority under 35 U.S.C. §119 to U.S. Provisional Patent Application No. 61/741,766, filed on Feb. 16, 2012, entitled "Third Party Component Debugging For Integrated Circuit Design," naming Charley W. Selvidge as inventor, which provisional patent application is incorporated entirely herein by reference.

FIELD

The present application is directed towards the field of testing electronic designs that include a proprietary component.

BACKGROUND

Electronic circuits, such as integrated circuits, are used in a variety of products, from automobiles to microwaves to personal computers. Designing and fabricating these circuits involves many steps, known as a "design flow." The particular steps of a design flow often are dependent upon the type of circuit being designed, its complexity, the design team, and the circuit fabricator or foundry that will manufacture the circuit. Typically, software and hardware "tools" will test a design at various stages of the design flow. The results of this testing then are used to identify and correct errors in the design. These testing processes are often referred to as verification, validation, or testing.

In some instances, verification will be facilitated by simulating the operation of the design using software, such as, for example, the QUESTA family of simulators available from Mentor Graphics Corporations of Wilsonville, Oreg. Electronic design simulators determine, using software executing on a computer, what the various states of an electronic design would be when presented with some input stimulus. Some designs however, may be too large or complex to efficiently simulate using software. Instead, the functionality of the circuit design will be verified by emulating the circuit design using a hardware emulator. Examples of hardware emulators include the VELOCE family of emulators available from Mentor Graphics Corporation of Wilsonville, Oreg., the ZEBU family of emulators available from EVE SA of Palaiseau, France, and the PALLADIUM family of emulators available from Cadence Design Systems of San Jose, Calif. An emulator typically will provide a set of configurable components for mimicking the operation of a circuit design. For example, emulators that use field-programmable gate array circuits can emulate the functionality of a circuit design using a combination of state elements, memories and lookup tables. Of course, other types of emulators may provide additional or alternate primitive components. For example, an emulator may function by using combinatorial elements computing a selectable function over a fixed number of inputs.

Modern integrated circuit designs often include pre-designed reusable components, referred to as "intellectual property" or "IP", herein referred to as "proprietary components." These proprietary components are often purchased or licensed from a third party. For example, if the integrated circuit is to include an analog to digital converter. A proprietary component for an analog to digital converter can be licensed from a third party vendor and then included in the design for the integrated circuit. This will save the designers from having to design their own analog to digital converter. These proprietary components can be described in a variety of formats usable by a circuit designer or design tool. For instance, a proprietary component may be described in a high-level description language (such as VHDL or Verilog), RTL, a netlist, a gate-level representation, or any other representation that is usable in the design flow. Furthermore, a proprietary component is often at least partially encrypted in a manner that allows them to be used by design and verification tools in the design flow, but does not allow the circuit designer to access or otherwise view the internals of the proprietary component.

Although these proprietary components have been pre-designed and are often free from errors or defects, this is not always the case. This is especially true where early access to the proprietary component is given to the integrated circuit designer before the third party vendor has fully verified the design. Any errors in the proprietary components will then be manifest during verification of the integrated circuit design that incorporates the proprietary component. Often, these errors only manifest after a complex sequence of operations are applied to the integrated circuit design during verification. In many cases, many billions of cycles of operation are required to be verified before the errors in the proprietary component manifest themselves.

As can be appreciated, the designers of the integrated circuit may not have the necessary understanding of the internals of the proprietary component to properly debug the errors. Furthermore, even if the designers of the integrated circuit did have the necessary understanding, they are often not given the ability to view the internal design of the proprietary component except at boundary signals or selected internal registers. As such, debugging the proprietary component would still not be possible. Typically this is due to security concerns around the design of the proprietary component. Similarly, the designers of the proprietary component often do not have access to the design for the integrated circuit that incorporates the proprietary component, since the design owner has security concerns similar to the third party vendor of the proprietary component. Furthermore, even if the proprietary component designers had access to the incorporating design, they may not have an ability to exercise the incorporating design in an environment that would allow the errors in the proprietary component to manifest.

Conventionally, in order to allow the third party vendor to debug a suspected problem in the proprietary component, a sequence of inputs is generated by the designers of the overall circuit. The input sequence corresponds to signal values applied to the inputs of the proprietary component during verification. Subsequently, the input sequence is sent to the third party vendor, who can then use the input sequence in a standalone verification environment for the proprietary component. As those of ordinary skill in the art will appreciate, these signal values are often captured from signal lines internal to the integrated circuit design during verification. Furthermore, since many billions of cycles of operation must be verified before the error is manifest, the input sequence will then correspond to these many billions signal values captured during verification. As a result, it is often impractical to construct the input sequence needed to reproduce the error in the proprietary components since the internal signal lines corresponding to the proprietary components inputs would need to be monitored and then the signal values on these signal lines would need to be captured for the many cycles of operation needed to reproduce the error.

SUMMARY

Aspects of the invention are directed towards facilitating the debugging of suspected errors in a proprietary component when the proprietary component is incorporated into a larger electronic design. Various implementations provide for the generation of a reference model for an integrated circuit design, where the reference model includes the proprietary component and sufficient information about the rest of the design to allow for the debugging of the proprietary component over a period of verification where the error in the proprietary component is suspected.

In one exemplary implementation, a verification model to be used for the verification of an electronic design, which includes a proprietary component, is generated. A verification tool is then configured to implement the verification model, and a verification process is caused to be carried out on the model by the verification tool. A state of the model at a first point of the verification process and signal values on signal lines interconnecting the electronic design and the proprietary component from the first point until a second point of the verification process are determined. This first point is selected such that the suspected error in the proprietary component has not yet been manifested in the verification process, while the second point is selected such that the suspected error manifests itself during the intervening period of verification between the first point and the second point.

A reference model can then be generated from the verification model. The reference model includes the proprietary component and allows debugging of the proprietary component by a third party vendor without exposing the overall design. For example, the reference model can be generated by removing or replacing selected sections of the verification model. Subsequently, the reference model, the determined state, and the determined signals may be used by the third party vendor to recreate the suspected errors in the proprietary component.

These and additional implementations of invention will be further understood from the following detailed disclosure of illustrative embodiments.

BRIEF DESCRIPTION OF THE DRAWINGS

The present invention will be described by way of illustrative implementations shown in the accompanying drawings in which like references denote similar elements, and in which.

DETAILED DESCRIPTION

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms such as "generate" to describe the disclosed implementations. These terms are often high-level abstractions of the actual operations that are performed. The actual operations that correspond to these terms will often vary, and their particular implementation will be apparent to those of ordinary skill in the art without a more detailed explanation.

Illustrative Operating Environment

Figure 1:
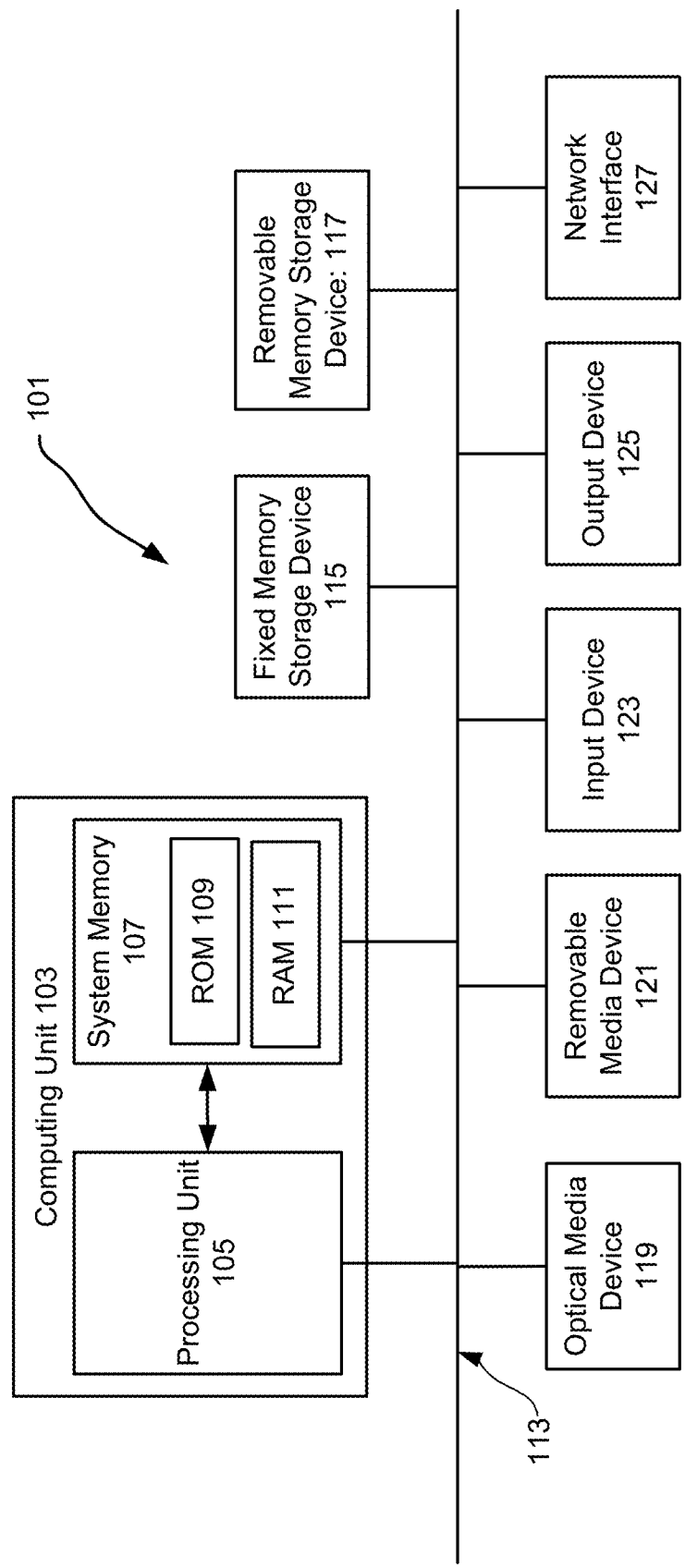
FIGS. 1 illustrates a programmable computing device.

As the techniques of the present invention may be implemented by a computer system executing software instructions, the components and operation of a computer system on which various implementations of the invention may be employed is described. FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be one or more microprocessors. The system memory 107 may include both a read-only memory ("ROM") 109 and a random access memory ("RAM") 111. As will be appreciated by those of ordinary skill in the art, both the ROM 109 and the RAM 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices, such as a fixed memory storage device 115, for example, a magnetic disk drive or solid state memory device; a removable memory storage device 117, for example, a removable solid state disk drive; an optical media device 119, for example, a digital video disk drive; or a removable media device 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, touchscreen, a printer, and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus ("USB") connection.

In some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol ("TCP") and the Internet protocol ("IP"). Also, the interface 127 may employ any suitable connection agent (or combination of agents) for connecting to a network, including, for example, a wireless transceiver, a modem, or an Ethernet connection.

It should be appreciated that the computing device 101 is shown here for illustrative purposes only, and it is not intended to be limiting. Various embodiments of the invention may be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

As stated above, various embodiments of the invention may be implemented using a programmable computer system executing software instructions, a computer readable medium having computer-executable software instructions stored thereon, or some combination thereof. Particularly, these software instructions may be stored on one or more computer readable media or devices, such as, for example, the system memory 107, fixed memory storage device 115, removable memory storage device 117, removable media device 121, or an optical disk for use in the optical media device 119. As those of ordinary skill in the art will appreciate, software instructions stored in the manner described herein are inherently non-transitory in nature. More specifically, the software instructions are available for execution by the computer system 101, as opposed to being transmitted to the computer system via a carrier wave or some other transitory signal.

Reference Information Generation for Proprietary Component Debugging

As indicated above, various implementations of the invention provide for the generation of a reference model for an integrated circuit design, where the reference model includes the proprietary component and sufficient information about the rest of the design to allow for the debugging of the proprietary component over a period of verification where the error in the proprietary component is suspected.

Figure 2:
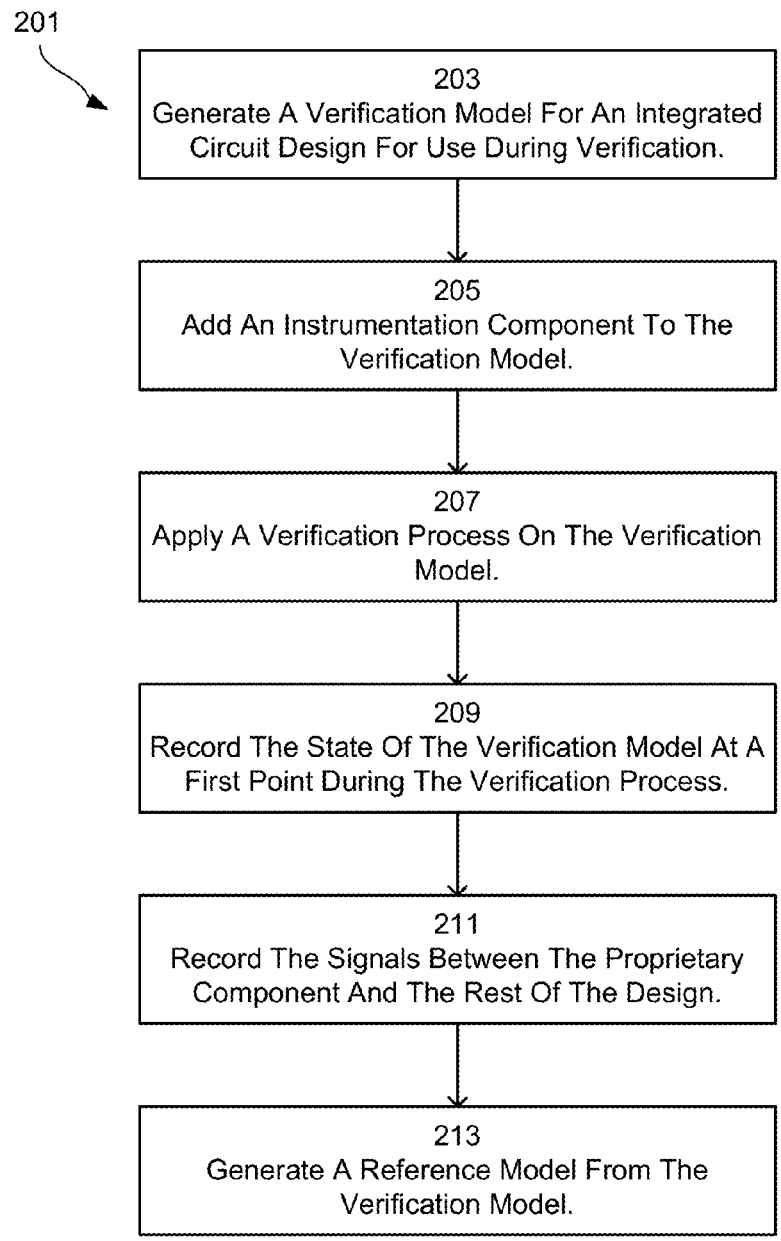
FIG. 2 illustrates an exemplary method of facilitating debugging of a proprietary component by a third party.

The reference model and recorded signals for causing the proprietary component to manifest the error to be debugged are collectively referred to herein as the "reference information." FIG. 2 shows a method 201 for generating the reference information according to various implementations of the invention. As can be seen from this figure, the method 201 includes an operation 203 for generating a verification model for an integrated circuit design, where the integrated circuit design includes a proprietary component. As indicated above, an integrated circuit design may include a proprietary component, which is a sub-portion of the overall integrated circuit design, such as the analog to digital converter example given above. Typically, the proprietary component will be licensed from a third party. Accordingly, the reference information may be provided to the third party to facilitate debugging of any errors suspected in the proprietary component (e.g., errors that appear during the verification of the integrated circuit design and are suspected to be caused by the proprietary component).

Figure 3:
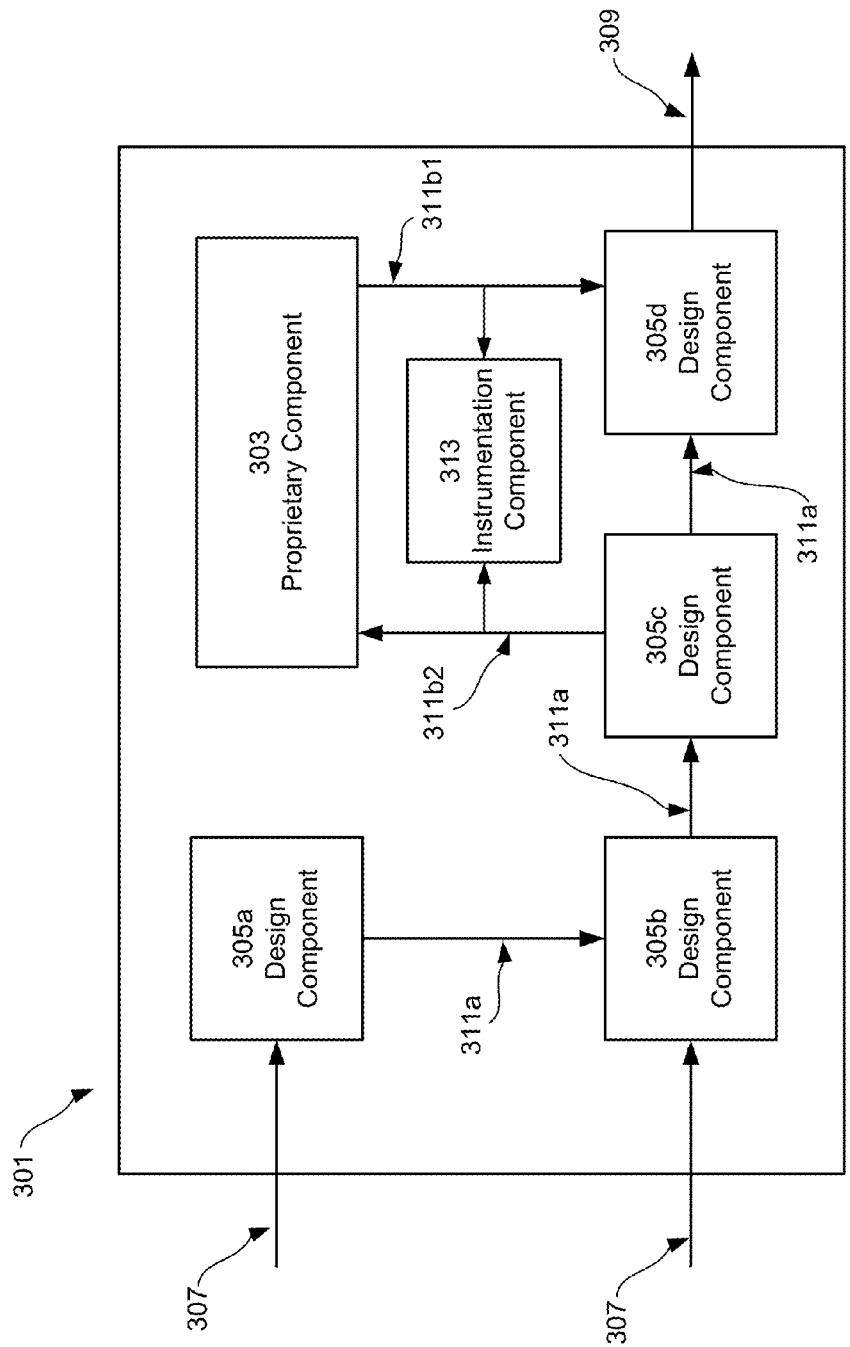
FIG. 3 illustrates an exemplary model for an electronic design.

FIG. 3 is a schematic block diagram showing an example verification model 301. The verification model 301 can comprise a representation in any of a variety of formats usable by a circuit designer or design tool. For instance, the verification model 301 can be described in a high-level description language (such as VHDL or Verilog), RTL, a netlist, a gate-level representation, or any other representation that is usable in the design flow.

As can be seen in FIG. 3, the verification model 310 includes a proprietary component 303 and other design components 305. As used herein, the "rest of the design" is referring to the other design components 305. More particularly, the rest of the design includes the contents of the design that are not incorporated by the proprietary component 303. This may include both design components 305 and internal signal lines 311. In various implementations, the operation 203 for generating the verification model 301 generates the model such that the boundary between the proprietary component 303 and the rest of the design (the design components 305) is distinct, which will be further described below.

Also shown in FIG. 3 are inputs 307 into the verification model 301, outputs 309 from the verification model 301, as well as internal signal lines 311. Additionally, an instrumentation component 313 (described below) is also shown.

Figure 4:
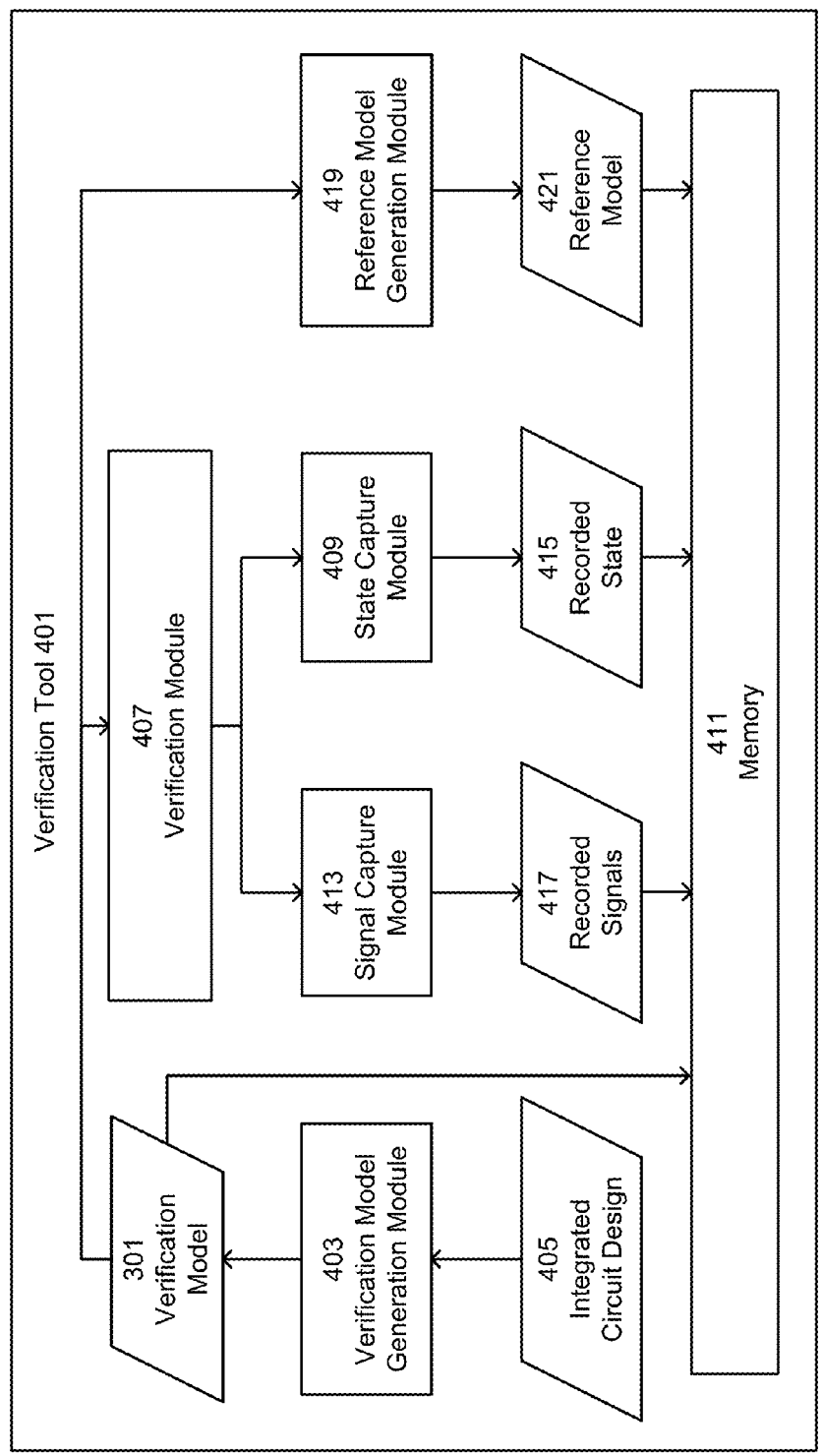
FIG. 4 illustrates an exemplary verification tool.

FIG. 4 is a schematic block diagram showing a verification tool 401 that may be used to implement the method 201. Reference to both FIG. 3 and FIG. 4 will be made in describing the rest of the operations of the method 201 detailed in FIG. 2, which includes an operation 205 for adding an instrumentation component 313 to the verification model 301.

The instrumentation component 313 is configured to capture the values on the internal signal lines 311$b$, that is, the signal lines 311 that connect the proprietary component 303 with the rest of the design. As stated above, the operation 203 generates the verification model 301 with a distinct boundary between the proprietary component 303 and the rest of the design. More specifically, as those of ordinary skill in the art will appreciate, the signal lines 311$b$1 and 311$b$2, which connect the proprietary component 303 with the other design components 305, are exposed within the verification model 301. As a result, the instrumentation component 313 may be added to the verification model 301 in order to capture the signal values on the internal signal lines 311$b$ along the boundary of the proprietary component 303 during a verification process.

The verification tool 401 includes a verification model generation module 403 configured to generate the verification model 301 from an integrated circuit design 405. The module 403 is configured to generate the verification model 301 such that the boundaries between the proprietary component 303 and the rest of the design are distinct, as detailed above. Furthermore, the module 403 is configured to add the instrumentation component 313 to the verification model 301. Various illustrative instrumentation components and techniques for capturing the signal values of the internal signal lines 311$b$ during verification are addressed below. The module 403 is further configured to save the verification model 301 to the memory 411.

In various implementations, the verification model 301 is represented in the form of a netlist. More specifically, the components and their interconnections can be represented in such a manner that the functionality of the integrated circuit design 405 may be implemented in a verification tool, such as a hardware emulator, and then used as the target of a verification process. In light of the description below, those of ordinary skill in the art will appreciate how to implement the verification generation module 403 and perform the operation 205 without further explanation.

The method 201 also provides an operation 207 for applying a verification process to the integrated circuit design based upon the verification model 301. A verification module 407, configured to apply the verification process on the verification model 301 is also provided in the tool 401. In various implementations, the verification process includes simulating the integrated circuit design 405 based upon the verification model 301. In other implementations, the verification process includes emulating the integrated circuit design 405 using a hardware emulator and the verification model 301. When a hardware emulator is used, the verification module 410 can comprise the software used to load the verification model into the emulator and the software provide run-time control and monitoring of the hardware emulator.

The method 201 further includes an operation 209 for recording a state of the verification model 301 at a first point of the verification process. This first point of the verification process is referred to herein as the "capture point". The state of the verification model 301 at the capture point is referred to herein as the "recorded state." As used herein, the recorded state corresponds to the logical state of the verification model 301 at the capture point. For example, one or more of the logical values stored in the different state elements (e.g., registers, such as flip flops) or the values output by the combinational elements (e.g., gates or LUTs) represented in the verification model 301 at the capture point can form the recorded state. A state capture module 409 is provided to determine the state of the verification model 301 at the capture point. This determined state, then is preserved as the recorded state 415 and saved to the memory 411.

In certain implementations of the invention, the operation 209 is "triggered" by some condition, such as a particular input signal being recognized on the inputs 307. Alternatively, a particular signal being recognized on the internal signal lines 311 can be used to trigger the operation 209. Still further, a particular state within the verification model 301 can be used to trigger the operation 207. In various implementations, a particular "time" could be used to determine the capture point. For instance, in some implementations, a particular number of clock cycles being processed in verification could be used to trigger the capture point. For example, once a specified number of simulation (or emulation) clock cycles have been processed by the verification module 407, the state capture module 409 will determine the logical state of the different components within the model 301 and record these states to the memory 411.

As indicated above, the capture point is typically specified, or chosen, such that the suspected error in the proprietary component has not yet manifest during verification. For example, if during application of the verification process, an error within the proprietary component 303 manifests after 1,000 clock cycles, then the capture point may be selected at a clock cycle prior to the 1,000th clock (e.g., one or more clock cycles prior to the 1,000th clock cycle). For example, the capture point could be specified as the 995th clock cycle. Alternatively, a known condition within the verification model 301 that occurs prior to the 1000th clock cycle could be used to trigger the capture point. Accordingly, the model may be monitored to identify the condition, after which the operation 209 may be initiated.

The method 201 then provides an operation 211 for recording the signal values on the internal signals lines 311b between the proprietary component 303 and the rest of the design, starting from the capture point until a later, second point during verification. This later point during verification is referred to herein as the "replay point." Similar to determining the capture point, the replay point can be determined by a "trigger" (e.g., some condition occurring within the model 301). It can similarly be specified in clock cycles. A signal capture module 413 is provided for capturing the signal values on the internal signal lines 311b between the capture point and the replay point. For example, if the capture point corresponded to the 1 billionth clock cycle during verification and the replay point corresponded to the 1.1 billionth clock cycle, then the capture module 413 would record the signal values on the internal signal lines 311b starting at the 1 billionth clock cycle during the verification process until the 1.1 billionth clock cycle and then save these signal values, as the recorded signals 417, to the memory 411. In certain implementations, the signal capture module 413 receives the captured signal values on the internal signal lines 311b from the instrumentation component 313.

With some implementations, as indicated above, the operation 211 will cause the signal values on internal signal lines 311b to be recorded. In some implementations, only the signal values on the internal signal lines 311b that go from the rest of the design to the proprietary component 303 are recorded. For example, and as illustrated in FIG. 3, the internal signal line 311b1 goes from the design component 305 to the proprietary component 303. Accordingly, the logical values on the signal line 311b1 between the capture point and the replay point would be recorded by the signal capture module 413. When all signal lines between the design components 305 and the proprietary components 303 are recorded (e.g., signal lines 311b and 311b1), then the recorded signals 417 can be used to both excite the proprietary component during a later debugging process and verify that the proprietary component is behaving during this later debugging process as it did during the verification process from which the recorded signals were obtained.

Figure 5:
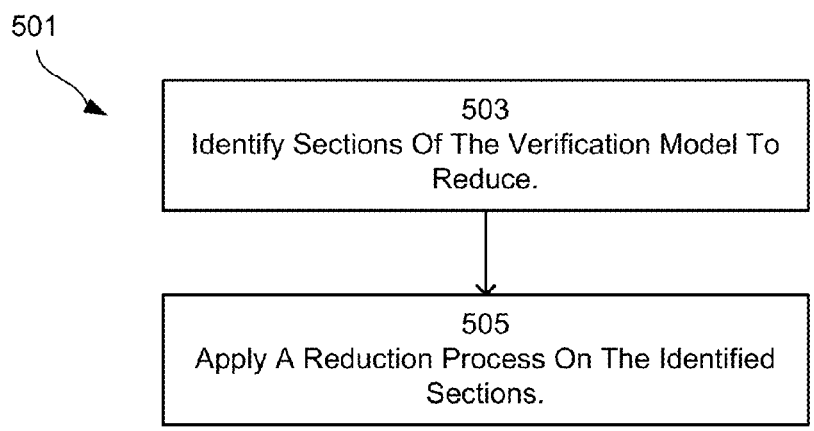
FIG. 5 illustrates an exemplary method of generating a reference model.
Figure 6A:
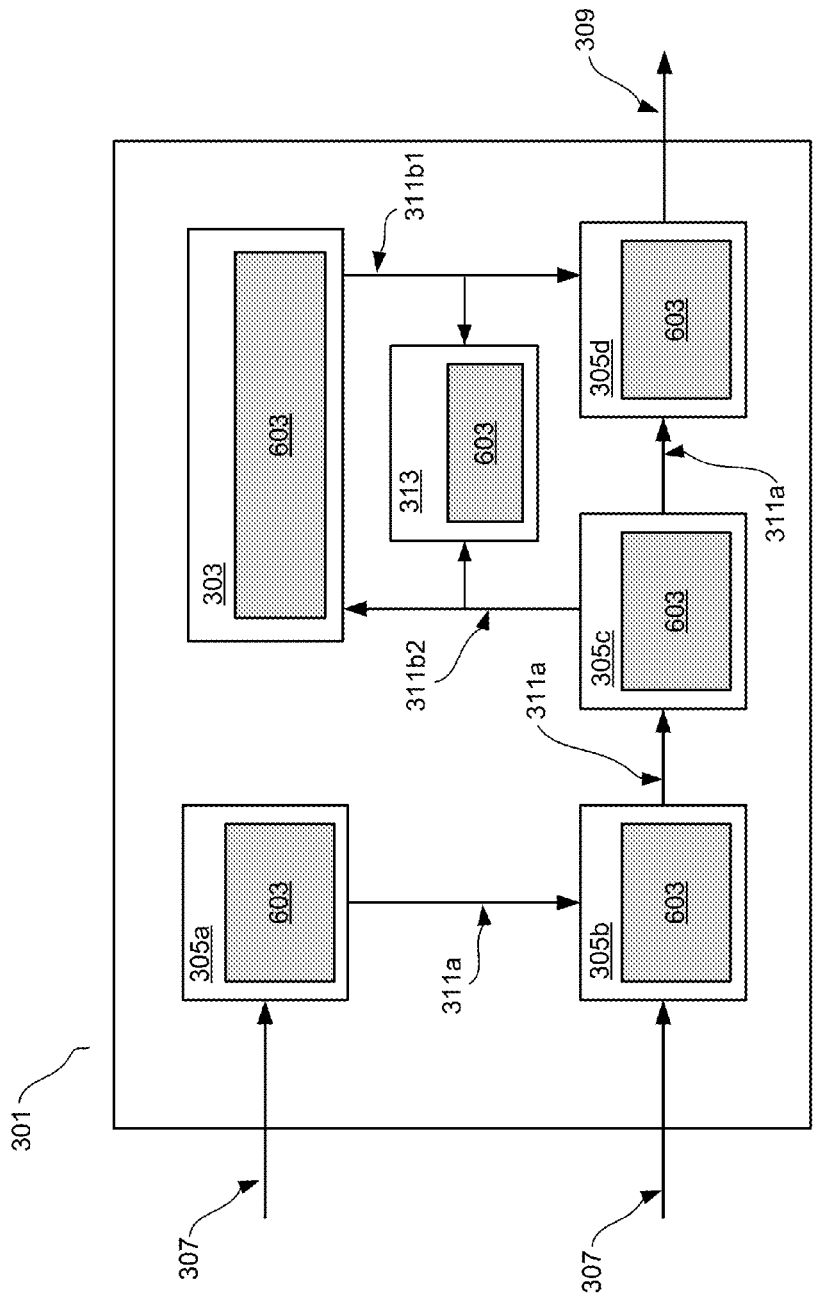
FIG. 6A illustrates the model for the electronic design shown in FIG. 3 in alternative detail.
Figure 6B:
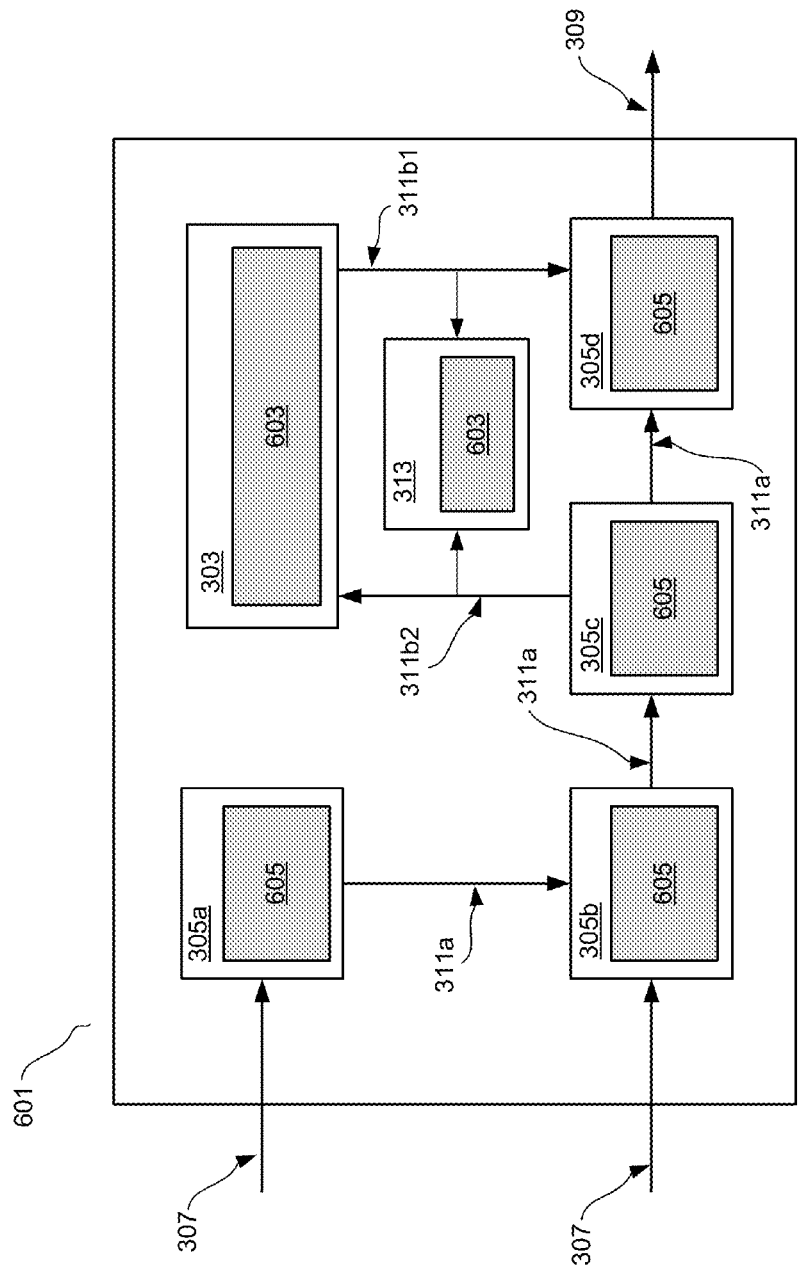
FIG. 6B shows an example reference model that may be generated from the model shown in FIG. 6A.

The method 201 further comprises an operation 213 for generating a reference model from the verification model. The tool 401 includes a reference model generation module 419 configured to generate a reference model 421 from the verification model 301 and the recorded state 415. As indicated above, the reference model is generated by removing or replacing portions of the verification model 301. FIG. 5 shows an exemplary method 501 that may be used to implement the operation 213 and generate the reference model 421. Additionally, FIG. 6A shows the verification model 301 in alternate detail and FIG. 6B shows a reference model 601 that may be generated from the verification model 301 according to various implementations of the invention. Reference to these figures will be made in describing the method 501.

Reference Model Generation

As can be seen from FIG. 5, the method 501 includes an operation 503 for identifying sections of the verification model 301 to reduce. In certain implementations, all design components 305 are identified. In alternative implementations, design components 305 selected by a user are identified. The method 501 then provides an operation 505 for reducing these identified sections to form the reference model.

As indicated above, the verification model 301 represents various different logical components, such as registers and their interconnections, which combined form the integrated circuit design 405. Accordingly, those of ordinary skill in the art will appreciate that the design components 305 will typically include both logical sub-components and interconnection sub-components. FIG. 6A shows the model 301 of FIG. 3 where the proprietary component 303, the design components 305 and the instrumentation component 313 all have internal design data 603 comprised of the logical sub-components and the interconnection sub-components.

In particular implementations, the operation 505 removes the logical sub-components from the design data 603 corresponding to the identified sections of the model 301. For example, FIG. 6B shows a reference model 601, which is the verification model 301 with design data 603 in the design components 305 replaced with interconnection sub-component-only data 605.

The reference model 601, the recorded state 415 and the recorded signals 417 (which together comprise the "reference information") could then be used in a process to debug the proprietary component 303 without exposing the rest of the design. For example, the reference information could be sent to the third party vendor of the proprietary component 303, who could then use the recorded state 415 to initialize the reference model 601 to that state (e.g., to load the logical values stored in the recorded state 415 into the corresponding logical elements in the reference design 601). Subsequently, the instrumentation component 313 could be used to apply the recorded signals to the proprietary component to "re-create" the verification conditions under which the suspected error was originally manifest.

With some implementations, the internal design data 603 in the reference model (e.g., the internal design data 603 corresponding to portions of the model 301 that were not "reduced" by the operation 505) are modified by adding a reference to the logical values in the recorded state 415. As indicated above, the recorded state 415 includes the values that are stored in the logical elements of the verification model 301 at the capture point. Accordingly, in some implementations, identification information corresponding to these logical values may be added to the reference model 601. As such, during a subsequent debugging process, the identification information may be used to aid in restoring the reference model to the recorded state 415.

As those or ordinary skill in the art will appreciate, verification processes rely on more than just a verification model 301 to perform verification. Accordingly, in some further implementations, these related verification resources (e.g., verification databases that describe the characteristics of the verification model, the visibility of the components within the model, and/or the runtime characteristics of the model) can be reduced to reflect the proprietary component 303 and the instrumentation component 313.

Instrumentation Component and Signal Recording

As indicated above, in certain implementations, capturing the recorded signals 417 is facilitated by the instrumentation component 313. In various implementations, the instrumentation component 313 comprises additional "logic" added into the verification model 301 that provides a capability to capture and later re-apply the signal values on the internal signal lines 311b. As those of ordinary skill in the art will appreciate, the structure of the instrumentation component 313 will depend on the type of connections between the proprietary component 313 and the rest of the design.

In certain implementations, the instrumentation component 313 is configured to capture values on the internal signal lines 311b on the rising clock edge, the falling clock edge, or both the rising and the falling clock edges. In some implementations, the instrumentations component 313 may include internal storage registers (e.g., flip flops or other memory elements, such as internal RAM) to capture these values. Subsequently, these values (e.g., the recorded signal 417) can then be either saved to the memory 411 or streamed to an external computing device, such as the computing device 101. The recorded signals 417 can then be reapplied to the proprietary component 303 by populating the instrumentation component 313 with the recorded signals and then injecting the rising and/or falling edge contributions of the signal vales onto the internal signal lines 311b.

With certain implementations (such as, for example, where the internal signal lines 311b include tristate or bidirectional values), the instrumentation component 313 comprises a first signal value monitoring component configured to monitor the tristate signal value attributable to the proprietary component 303 and a second signal value monitoring component configured to monitor the tristate signal value attributable to the rest of the design. The contributions can then be separated and the tristate signal represented as a 2-state equivalent. This 2-state equivalent can then be stored to the memory 411, or streamed to another computing device as indicated above.

With some implementations, the instrumentation component 313 can be selectively disabled during verification. For example, the instrumentation component 313, may capture the signal values on the internal signal lines 311b1 and 311b2; however, recording the captured values to the memory 411 or streaming them to another computing device can be disabled.

CONCLUSION

Although certain devices and methods have been described above in terms of the illustrative embodiments, the person of ordinary skill in the art will recognize that other embodiments, examples, substitutions, modification and alterations are possible. It is intended that the following claims and their equivalents cover such other embodiments, examples, substitutions, modifications and alterations within the spirit and scope of the claims and their equivalents.

What is claimed is:

1. A computer-implemented method comprising:
generating, using a processing unit, a verification model that represents an electronic design including a proprietary component, the proprietary component being a pre-designed, reusable third-party component, the electronic design including design components coupled to the proprietary component, wherein the design components are not reusable, third-party components;
wherein generating the verification model includes inserting an instrumentation component between the proprietary component and the design components so that the proprietary component is coupled to both the design components and the instrumentation component to passively capture signals there between;
causing a verification tool to implement the verification model;
determining a state of the verification model at a first point of a verification process applied to the implemented verification model by the verification tool;
determining one or more signal values on one or more signal lines that interconnect the proprietary component with the electronic design from the first point during the verification process until a second point during the verification process; and
generating a reference model for the electronic design from the verification model, the reference model, the determined state and the determined signal values usable to debug the proprietary component.

2. The computer-implemented method recited in claim 1, wherein the generating the verification model that represents the electronic design including the proprietary component comprises adding an instrumentation component to the verification model, the instrumentation component being configured to capture the signal values on the signal lines that interconnect the proprietary component and the electronic design.

3. The computer-implemented method recited in claim 1, wherein the determining the state of the verification model at the first point of the verification process applied to the implemented verification model by the verification tool comprises identifying logical values stored in state elements in the electronic design at the first point during verification.

4. The computer-implemented method recited in claim 1, wherein the verification model includes a plurality of logical components, and wherein the generating the reference model for the electronic design from the verification model comprises removing selected ones of the plurality of logical elements from the verification model.

5. The computer-implemented method recited in claim 1, wherein the verification tool comprising a hardware emulator.

6. The computer-implemented method recited in claim 1, wherein the verification tool comprising a software simulator.

7. A computer readable storage medium storing the reference model generated by the method of claim 1.

8. A computer readable storage medium storing computer executable instructions which when executed by a computer system cause the computer system to perform the method of claim 1.

9. A hardware emulation environment comprising:
   a hardware emulator configured to implement an electronic design;
   a verification state capture component configured to determine a state of the electronic design at a first point of a verification process applied on the electronic design by the hardware emulator;
   a verification signal capture component configured to determine signal values on signal lines interconnecting the electronic design and a proprietary component included in the electronic design, the verification signal capture component being coupled in parallel between signal lines, which extend between the electronic design and the proprietary component;
   a reference model generation component configured to generate a reference model for the electronic design from the verification model and the determined state, the reference model and the determined signal values usable to debug the proprietary component.

10. A computer readable medium storing computer executable instructions which when executed by a computer system perform a method, the method comprising:
    modifying a representation of an electronic circuit design, the electronic circuit design comprising one or more circuit components and a proprietary circuit component, which is a reusable component coupled to the one or more circuit components, the modifying comprising,
    adding an instrumentation component to the electronic circuit design connected in parallel between signal lines extending between the proprietary circuit component and the one or more circuit components, the instrumentation component being configured to capture one or more signals between at least one of the circuit components and the proprietary circuit component; and
    removing design information for one or more of the circuit components from the representation of the electronic circuit design.

11. The computer readable medium of claim 10, wherein the proprietary circuit component is a pre-designed circuit component from a third party and is at least partially encrypted.

12. The computer readable medium of claim 10, wherein the removing the design information comprises: identifying one or more logical sub-components of the one or more circuit components; and removing at least a portion of the one or more logical sub-components from the electronic circuit design 13. The computer readable medium of claim 10, wherein the instrumentation component comprises one or more registers for capturing the one or more signals between the at least one of the circuit components and the proprietary circuit component.

14. The computer readable medium of claim 10, wherein the instrumentation component is configured to capture signals input into the proprietary component but not signals output from the proprietary component.

15. The computer readable medium of claim 10, wherein the instrumentation component is configured to capture signals input into the proprietary component and signals output from the proprietary component.

16. The computer readable medium of claim 10, wherein the method further comprises:
    causing a verification tool to implement the modified electronic circuit design using the modified representation of the electronic circuit design;
    determining one or more signal values captured by the instrumentation component over multiple verification clock cycles, the multiple verification clock cycles including a clock cycle in which the proprietary component manifests an error.

17. The computer readable medium of claim 16, wherein the method further comprises determining a state of the electronic circuit design at a first of the multiple verification clock cycles.

18. The computer readable medium of claim 17, wherein the method further comprises generating a reference model for the electronic design from the modified electronic circuit design, the determined state, and the determined signal values, the reference model being usable to debug the proprietary component.

* * * * *